(12) United States Patent
Ito

(10) Patent No.: US 10,637,035 B2
(45) Date of Patent: Apr. 28, 2020

(54) ENERGY STORAGE DEVICE

(71) Applicant: GS Yuasa International Ltd., Kyoto-shi (JP)

(72) Inventor: Shun Ito, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 46 days.

(21) Appl. No.: 15/547,411

(22) PCT Filed: Mar. 30, 2016

(86) PCT No.: PCT/JP2016/060429
§ 371 (c)(1),
(2) Date: Jul. 28, 2017

(87) PCT Pub. No.: WO2016/159099
PCT Pub. Date: Oct. 6, 2016

(65) Prior Publication Data
US 2018/0013123 A1    Jan. 11, 2018

(30) Foreign Application Priority Data

Mar. 31, 2015    (JP) ................................. 2015-073010

(51) Int. Cl.
*H01M 2/00*    (2006.01)
*H01M 2/26*    (2006.01)
(Continued)

(52) U.S. Cl.
CPC ............ *H01M 2/263* (2013.01); *H01G 11/74* (2013.01); *H01G 11/78* (2013.01);
(Continued)

(58) Field of Classification Search
CPC ......... H01G 11/74; H01G 11/78; H01M 2/04; H01M 2/26; H01M 2/0277; H01M 2/263; Y02E 60/13
See application file for complete search history.

(56) References Cited

U.S. PATENT DOCUMENTS

2011/0052969 A1*    3/2011    Cai .................... H01M 2/204
429/158
2012/0148911 A1    6/2012    Suzuki et al.
(Continued)

FOREIGN PATENT DOCUMENTS

JP    H 10-50555 A    2/1998
JP    2011-049064 A    3/2011
(Continued)

OTHER PUBLICATIONS

International Search Report (ISR) (PCT/ISA/210), in PCT/JP2016/060429, dated May 31, 2016.

*Primary Examiner* — Cynthia H Kelly
*Assistant Examiner* — Monique M Wills
(74) *Attorney, Agent, or Firm* — McGinn I.P. Law Group, PLLC.

(57) ABSTRACT

An energy storage device includes: an electrode assembly; a positive electrode current collector and a negative electrode current collector connected to the electrode assembly; and a container configured to house the electrode assembly and the positive electrode current collector and the negative electrode current collector, wherein the container has recessed portions, a connecting portion of the positive electrode current collector and a connecting portion of the negative electrode current collector respectively connected to the electrode assembly are housed in the recessed portions, respectively, the electrode assembly has a tab portion which includes a connecting portion connected to the positive electrode current collector and a tab portion which includes
(Continued)

a connecting portion connected to the negative electrode current collector, and the tab portions have a bent portion respectively.

19 Claims, 10 Drawing Sheets

(51) Int. Cl.
  *H01G 11/74* (2013.01)
  *H01G 11/78* (2013.01)
  *H01M 2/04* (2006.01)
  *H01M 2/02* (2006.01)
  *H01M 2/30* (2006.01)

(52) U.S. Cl.
  CPC ........... *H01M 2/0277* (2013.01); *H01M 2/04* (2013.01); *H01M 2/0473* (2013.01); *H01M 2/26* (2013.01); *H01M 2/30* (2013.01); *Y02E 60/13* (2013.01); *Y02T 10/7022* (2013.01)

(56) References Cited

U.S. PATENT DOCUMENTS

| | | |
|---|---|---|
| 2012/0196160 A1 | 8/2012 | Guen |
| 2012/0196178 A1 | 8/2012 | Kambayashi et al. |
| 2013/0196218 A1 | 8/2013 | Masuda |
| 2014/0030587 A1* | 1/2014 | Tsuruta .................. H01M 2/24 429/179 |
| 2014/0272550 A1 | 9/2014 | Ishii et al. |
| 2015/0104694 A1 | 4/2015 | Okuda et al. |
| 2015/0364732 A1* | 12/2015 | Kim ....................... H01M 2/08 429/179 |

FOREIGN PATENT DOCUMENTS

| | | |
|---|---|---|
| JP | 2012-124132 A | 6/2012 |
| JP | 2012-160313 A | 8/2012 |
| JP | 2012-160425 A | 8/2012 |
| JP | 2012-230905 A | 11/2012 |
| JP | 2013-137992 A | 7/2013 |
| JP | 2013-161757 A | 8/2013 |
| JP | 2013-196959 A | 9/2013 |
| JP | 2014-179214 A | 9/2014 |
| JP | 2014-212130 A | 11/2014 |
| JP | 2015-115210 A | 6/2015 |
| JP | 2015-149362 A | 8/2015 |
| JP | 2015-176788 A | 10/2015 |
| JP | WO2013/157433 A1 | 12/2015 |

* cited by examiner

ENERGY STORAGE DEVICE

TECHNICAL FIELD

The present invention relates to an energy storage device equipped with an electrode assembly, a current collector connected to the electrode assembly and a container which houses the electrode assembly and the current collector therein.

BACKGROUND ART

Conventionally, in an energy storage device equipped with an electrode assembly, a current collector; and a container which houses the electrode assembly and the current collector therein, there has been known a configuration where the electrode assembly and the current collector are connected to each other (see Patent Document 1, for example).

PRIOR ART DOCUMENT

Patent Document

Patent Document 1; JP-A-2014-179214

SUMMARY OF THE INVENTION

Problems to be Solved by the Invention

However, in the energy storage device having such a configuration, there may be a case where a dead space is generated in the container around the connecting portion between the electrode assembly and the current collector.

The present invention has been made to solve such problems, and it is an object of the present invention to provide an energy storage device which allows the electrode assembly to ensure a large occupying ratio in the container by reducing a dead space around a connecting portion between the electrode assembly and the current collector.

Means for Solving the Problems

To achieve the above-mentioned problem, according to an aspect of the present invention, there is provided an energy storage device which includes: an electrode assembly; a current collector connected to the electrode assembly; and a container configured to house the electrode assembly and the current collector, wherein the container has a recessed portion, a connecting portion of the current collector connected to the electrode assembly is housed in the recessed portion, the electrode assembly has a tab portion which includes a connecting portion connected to the current collector, and the tab portion has a bent portion.

Advantages of the Invention

According to the present invention, it is possible to provide an energy storage device which allows an electrode assembly to ensure a large occupying ratio in a container by reducing a dead space around a connecting portion between the electrode assembly and the current collector.

MODE FOR CARRYING OUT THE INVENTION

Figure 1:
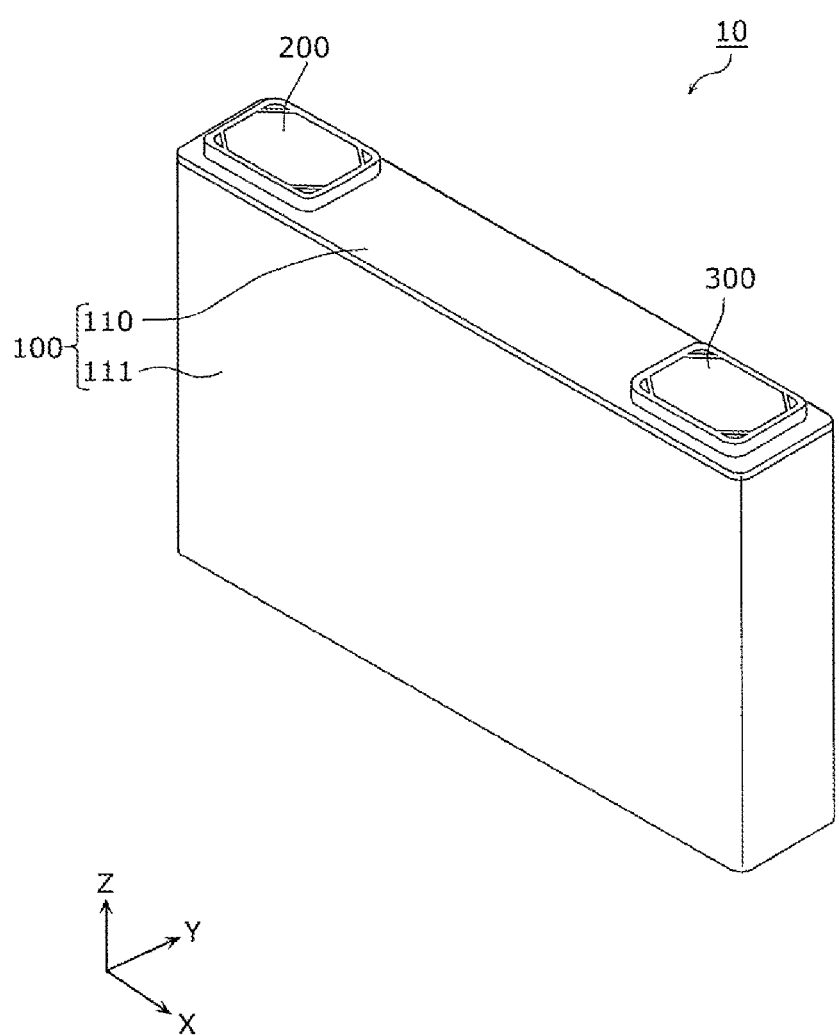
FIG. 1 is a perspective view schematically showing an external appearance of an energy storage device according to an embodiment.

In the above-mentioned conventional energy storage device, there may be a case where a dead space is generated in the container around the connecting portion between the electrode assembly and the current collector.

The present invention has been made to solve such problems, and it is an object of the present invention to provide an energy storage device which allows the electrode assembly to ensure a large occupying ratio in the container by reducing a dead space around a connecting portion between the electrode assembly and the current collectors.

To achieve the above-mentioned problem, according to an aspect of the present invention, there is provided an energy storage device which includes: an electrode assembly; a current collector connected to the electrode assembly; and a container configured to house the electrode assembly and the current collector, wherein the container has a recessed portion, a connecting portion of the current collector connected to the electrode assembly is housed in the recessed portion, the electrode assembly has a tab portion which includes a connecting portion connected to the current collector, and the tab portion has a bent portion.

With such a configuration, the connecting portion of the current collector connected to the electrode assembly is housed in the recessed portion of the container. Accordingly, a dead space around the connecting portion is reduced and hence, it is possible to allow the electrode assembly to ensure a large occupying ratio in the container.

Further, the electrode assembly has the tab portion and hence, the connecting portion between the electrode assembly and the current collector can be easily housed in the recessed portion of the container. Still further, the tab portion has the bent portion and hence, the dead space in the container can be further reduced.

The bent portion may be housed in the recessed portion.

Since the bent portion is housed in the recessed portion, the dead space in the container can be further reduced. Accordingly, it is possible to allow the electrode assembly to ensure a larger occupying ratio in the container.

The tab portion may include the connecting portion of the electrode assembly extending parallel to the current collector, and the bent portion bent from the connecting portion.

The connecting portion of the electrode assembly connected to the current collector may be housed in the recessed portion.

In the above-mentioned configurations, the connecting portion of the electrode assembly connected to the current collector is a portion which does not contribute to power generation and hence, by housing the connecting portion in the recessed portion, it is possible to allow a portion which contributes to power generation to ensure a large occupying ratio in the container.

The tab portion may be formed by bundling portions projecting from stacked plates which form the electrode assembly, and the tab portion may be disposed at a position which faces an inner surface of the recessed portion.

With such a configuration, the tab portion is disposed at the position which faces the inner surface of the recessed portion and hence, a length of the tab portion can be shortened whereby the dead space in the container can be further reduced.

The energy storage device may further include an insulating member which covers the inner surface of the recessed portion.

With such a configuration, the inner surface of the recessed portion is covered by the insulating member and hence, it is possible to ensure insulation between the electrode assembly and the current collector positioned in the recessed portion.

The insulating member may further cover an inner surface of the container positioned around the recessed portion.

With such a configuration, the insulating member covers the inner surface of the container positioned around the recessed portion and hence, it is possible to ensure insulation between the electrode assembly and the container with more certainty.

The energy storage device may further include a fastening portion which fastens the container and the current collector to each other, and a distal end portion of the fastening portion on a container inner side may be disposed in the recessed portion.

With such a configuration, the distal end portion of the fastening portion on a container inner side is disposed in the recessed portion and hence, a ratio of a space which can be utilized as a space for disposing the electrode assembly in the container can be further increased.

The container may further include a container body and a lid body, and the recessed portion may be formed inside a portion of the lid body which projects outward.

With such a configuration, the recessed portion is formed inside the portion where the lid body projects outward and hence, the recessed portion can be more easily formed by press working or the like compared to the case where the recessed portion is formed on the container body.

Hereinafter, an energy storage device according to an embodiment of the present invention is described with reference to drawings. The embodiment described hereinafter is one preferred specific example of the present invention. In the embodiment described hereinafter, numerical values, shapes, materials, constitutional elements, the arrangement positions and connection states of the constitutional elements, the manufacturing method, the order of manufacturing steps and the like are merely examples, and these are not intended to be used for limiting the present invention. Further, out of the constitutional elements in the embodiment described hereinafter, the constitutional elements which are not described in independent claims describing an uppermost concept of the present invention are described as arbitrary constitutional elements which form more preferable mode. In the respective drawings, the respective constitutional elements are not always described strictly accurate in size or the like.

(Embodiment)

Firstly, the configuration of an energy storage device 10 is described in detail.

FIG. 1 is a perspective view schematically showing an external appearance of the energy storage device 10 according to the embodiment.

Figure 2:
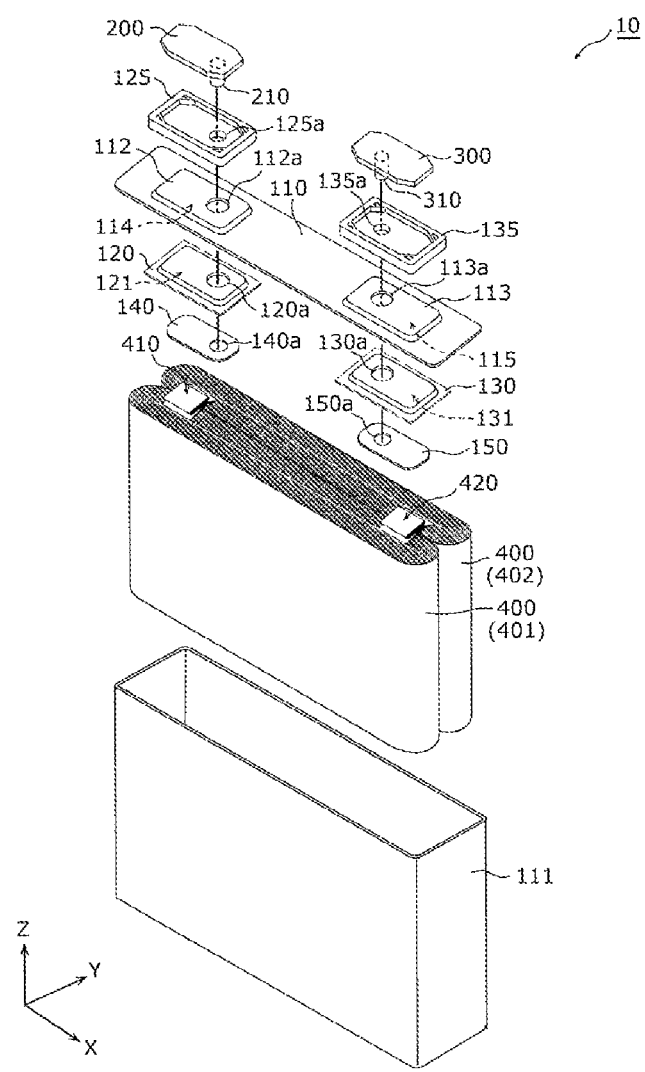
FIG. 2 is an exploded perspective view of the energy storage device according to the embodiment.

FIG. 2 is an exploded perspective view of the energy storage device 10 according to the embodiment.

In FIG. 1 and the succeeding drawings, for the sake of convenience, the description may be made while assuming a Z axis direction as a vertical direction. However, in an actual use state, there may be also a case where the Z axis direction and the vertical direction do not agree with each other.

The energy storage device 10 is a secondary battery which can charge electricity or discharge electricity. To be more specific, the energy storage device 10 is a nonaqueous electrolyte secondary battery such as a lithium ion secondary battery. The energy storage device 10 is applicable to an electric vehicle (EV), a hybrid electric vehicle (HEV), a plug-in hybrid electric vehicle (PHEV) or the like, for example. The energy storage device 10 is not limited to a nonaqueous electrolyte secondary battery, and may be a secondary battery other than the nonaqueous electrolyte secondary battery, or may be a capacitor.

As shown in FIG. 1, the energy storage device 10 includes: a container 100; a positive electrode terminal 200; and a negative electrode terminal 300. As shown in FIG. 2, a positive electrode current collector 140, a negative electrode current collector 150, and a plurality of electrode assemblies 400 (in this embodiment, two electrode assemblies 401, 402) are housed in the container 100. The energy storage device 10 further includes lower insulating members 120, 130 disposed below (on a minus side in the Z axis direction of) a lid body 110, and upper insulating members 125, 135 disposed above (on a plus side in the Z axis direction of) the lid body 110 at positions facing the lower insulating members 120, 130 respectively.

In addition to the above-mentioned constitutional elements, spacers disposed between the electrode assembly 400 and an inner wall of the container 100, a safety valve which releases a pressure in the container 100 when the pressure in the container 100 is increased, an insulating film which embraces the electrode assembly 400 and the like may also be disposed in the container 100. Although a liquid such as an electrolyte solution (nonaqueous electrolyte) is sealed in the container 100 of the energy storage device 10, the illustration of such a liquid is omitted.

The container 100 is formed of a main body 111 having a bottomed rectangular cylindrical shape; and a lid body 110 formed of a plate-like member which closes an opening of the main body 111. The container 100 is configured such that the inside of the container 100 is hermetically sealed by joining the lid body 110 and the main body 111 to each other by welding or the like after the electrode assemblies 400 and the like are housed in the container 100. Although a material for forming the lid body 110 and a material for forming the main body 111 are not particularly limited, it is preferable that the lid body 110 and the main body 111 be made of weldable metal such as stainless steel, aluminum, or an aluminum alloy, for example.

Projecting portions which project outward are formed on the container 100, in this embodiment, projecting portions 112, 113 are formed on the lid body 110 of the container 100.

To be more specific, the projecting portions 112, 113 are portions (lid plate drawing portions) which are positioned below (on a minus side in the Z axis direction of) the positive electrode terminal 200 and the negative electrode terminal 300 respectively and are formed such that portions of a plate-like member are projected by press working (drawing), for example. That is, the lid body 110 is a thick member having a substantially fixed wall thickness which projects outward at the projecting portions 112, 113. In this embodiment, "substantially fixed" mans that the lid body 110 may not have a completely fixed thickness, and it is sufficient for the lid body 110 to have a substantially fixed thickness.

Accordingly, a recessed portion 114 is formed inside the projecting portion 112 (on a back side of the lid body 110) due to the projection of the projecting portion 112. Further, in the same manner as the inside of the projecting portion 112, a recessed portion 115 is formed inside the projecting portion 113.

In the recessed portions 114, 115 formed as described above, connecting portions between the electrode assemblies 400 (electrode assemblies 401, 402) and the current collectors (positive electrode current collector 140, negative electrode current collector 150) are housed respectively. To be more specific, the connecting portion between a positive electrode of the electrode assemblies 400 and the positive electrode current collector 140 (hereinafter also referred to as "positive-electrode-side connecting portion") is housed in the recessed portion 114, and the connecting portion between a negative electrode of the electrode assemblies 400 and the negative electrode current collector 150 (hereinafter also referred to as "negative-electrode-side connecting portion") is housed in the recessed portion 115. Detailed configurations of these connecting portions are described later.

The lower insulating members 120, 130 and the upper insulating members 125, 135 are members for electrically insulating the lid body 110 of the container 100, the electrode terminals (positive electrode terminal 200, negative electrode terminal 300), and the current collectors (positive electrode current collector 140, negative electrode current collector 150) from each other.

The lower insulating member 120 is a member for electrically insulating the positive electrode current collector 140 and the lid body 110 from each other, and the lower insulating member 130 is a member for electrically insulating the negative electrode current collector 150 and the lid body 110 from each other. The lower insulating member 120 is disposed so as to cover inner surfaces of the recessed portion 114 formed on the lid body 110 and, further, is disposed so as to cover an inner surface of the lid body 110 positioned around the recessed portion 114.

To be more specific, a projecting portion which projects upward (toward a plus side in the Z axis direction) so as to cover the inner surfaces of the recessed portion 114 is formed on the lower insulating member 120, and a recessed portion 121 in which the positive-electrode-side connecting portion is housed is formed on a back side of the projecting portion. Accordingly, at least a portion of the recessed portion 121 is positioned inside the recessed portion 114 formed on the lid body 110. With such a configuration, the positive-electrode-side connecting portion housed in the recessed portion 121 formed on the lower insulating member 120 is housed in the recessed portion 114 formed on the lid body 110.

Also the lower insulating member 130 is configured substantially in the same manner as the lower insulating member 120, that is, a recessed portion 131 in which the negative-electrode-side connecting portion is housed is formed on a back side (a minus side in the Z axis direction) of the lower insulating member 130. The lower insulating member 130 is disposed such that the positional relationship between the lower insulating member 130 and the configuration of the negative electrode side (the recessed portion 115, the negative-electrode-side connecting portion and the like) is substantially equal to the positional relationship between the lower insulating member 120 and the configuration of the positive electrode side (the recessed portion 114, the positive-electrode-side connecting portion and the like).

The upper insulating member 125 is a member for electrically insulating the positive electrode terminal 200 and the lid body 110 from each other, and the upper insulating member 135 is a member for electrically insulating the negative electrode terminal 300 and the lid body 110 from each other. A recessed portion is formed on both sides of the upper insulating member 125 in a vertical direction (both side in the Z axis direction), and at least a portion of the projecting portion 112 is housed in the recessed portion formed on a lower side and at least a portion of the positive electrode terminal 200 is housed in the recessed portion formed on an upper side. With such a configuration, even when the positive electrode terminal 200 is disposed at a portion (projecting portion 112) of the container 100 which projects outward, it is possible to ensure the insulation between the positive electrode terminal 200 and the container 100 with more certainty.

Also the upper insulating member 135 is configured substantially in the same manner as the upper insulating member 125, that is, the upper insulating member 135 is disposed so as to be associated with the negative-electrode-side constitutional elements (projecting portion 113 and the like).

The lower insulating members 120, 130 are packings on a lower side of the lid body 110 (lower packings), and the upper insulating members 125, 135 are packings on an upper side of the lid body 110 (upper packings). That is, in this embodiment, the lower insulating members 120, 130 and the upper insulating members 125, 135 also have a function of providing sealing between the container 100 and fastening portions 210 310 (described later) which penetrate the container 100. The lower insulating members 120, 130 and the upper insulating members 125, 135 are made of an insulating resin such as polycarbonate or polypropylene (PP), for example. However, the lower insulating members 120, 130 and the upper insulating members 125, 135 may be made of any material provided that the lower insulating members 120, 130 and the upper insulating members 125, 135 are made of a material having an insulating property.

The positive electrode terminal 200 is an electrode terminal which is electrically connected to positive electrodes of the electrode assemblies 400 through a positive electrode current collector 140, and the negative electrode terminal 300 is an electrode terminal which is electrically connected to negative electrodes of the electrode assemblies 400 through a negative electrode current collector 150. That is, the positive electrode terminal 200 and the negative electrode terminal 300 are respectively formed of a metal-made electrode terminal for deriving electricity stored in the electrode assemblies 400 to a space outside the energy storage device 10 or for introducing electricity into a space inside the energy storage device 10 for storing electricity in the electrode assemblies 400. The positive electrode terminal 200 and the negative electrode terminal 300 are mounted on the lid body 110 disposed above the electrode assemblies 400. The positive electrode terminal 200 and the negative electrode terminal 300 are made of aluminum, an aluminum alloy or the like.

The fastening portion 210 which fastens the container 100 and the positive electrode current collector 140 to each other is formed on the positive electrode terminal 200, and the fastening portion 310 which fastens the container 100 and the negative electrode current collector 150 to each other is formed on the negative electrode terminal 300.

The fastening portion 210 is a member (rivet) extending downward from the positive electrode terminal 200, and is caulked in a state where the fastening portion 210 is inserted into a through hole 140a of the positive electrode current collector 140. To be more specific, the fastening portion 210 is caulked in a state where the fastening portion 210 is inserted into a through hole 125a of the upper insulating member 125, a through hole 112a of the lid body 110, a through hole 120a of the lower insulating member 120, and the through hole 140a of the positive electrode current collector 140. With such a configuration, the positive electrode terminal 200 and the positive electrode current collector 140 are electrically connected to each other, and the positive electrode current collector 140 is fixed to the lid body 110 together with the positive electrode terminal 200, the upper insulating member 125, and the lower insulating member 120.

The fastening portion 310 is a member (rivet) extending downward from the negative electrode terminal 300, and is caulked in a state where the fastening portion 310 is inserted into a through hole 150a of the negative electrode current collector 150. To be more specific, the fastening portion 310 is caulked in a state where the fastening portion 310 is inserted into a through hole 135a of the upper insulating member 135, a through hole 113a of the lid body 110, a through hole 130a of the lower insulating member 130, and the through hole 150a of the negative electrode current collector 150.

With such a configuration, the negative electrode terminal 300 and the negative electrode current collector 150 are electrically connected to each other, and the negative electrode current collector 150 is fixed to the lid body 110 together with the negative electrode terminal 300, the upper insulating member 135, and the lower insulating member 130.

The fastening portion 210 may be integrally formed with the positive electrode terminal 200, or the fastening portion 210 which is formed as a part separated from the positive electrode terminal 200 may be fixed to the positive electrode terminal 200 using a method such as caulking or welding. The same goes for the relationship between the fastening portion 310 and the negative electrode terminal 300.

The positive electrode current collector 140 is a member having conductivity and rigidity which is disposed between the electrode assemblies 400 and the container 100, and connects the electrode assemblies 400 and the positive electrode terminal 200 to each other. To be more specific, the positive electrode current collector 140 is disposed between a positive-electrode-side tab portion 410 (described later) of the electrode assemblies 400 and the lid body 110, and is joined to the tab portion 410 by welding or the like. To be further more specific, the positive electrode current collector 140 is housed in the recessed portion 114 formed on the lid body 110 in a state where the positive electrode current collector 140 is joined to the tab portion 410. The positive electrode current collector 140 is made of aluminum, an aluminum alloy or the like in the same manner as a positive electrode current collecting foil (positive electrode substrate layer) of the positive electrode.

The negative electrode current collector 150 is a member having conductivity and rigidity which is disposed between the electrode assemblies 400 and the container 100, and connects the electrode assemblies 400 and the negative electrode terminal 300 to each other. To be more specific, the negative electrode current collector 150 is disposed between a negative-electrode-side tab portion 420 (described later) of the electrode assemblies 400 and the lid body 110, and is joined to the tab portion 420 by welding or the like. To be further more specific, the negative electrode current collector 150 is housed in the recessed portion 115 formed on the lid body 110 in a state where the negative electrode current collector 150 is joined to the tab portion 410. The negative electrode current collector 150 is made of copper, a copper alloy or the like in the same manner as a negative electrode current collecting foil (negative electrode substrate layer) of the negative electrode.

Figure 3:
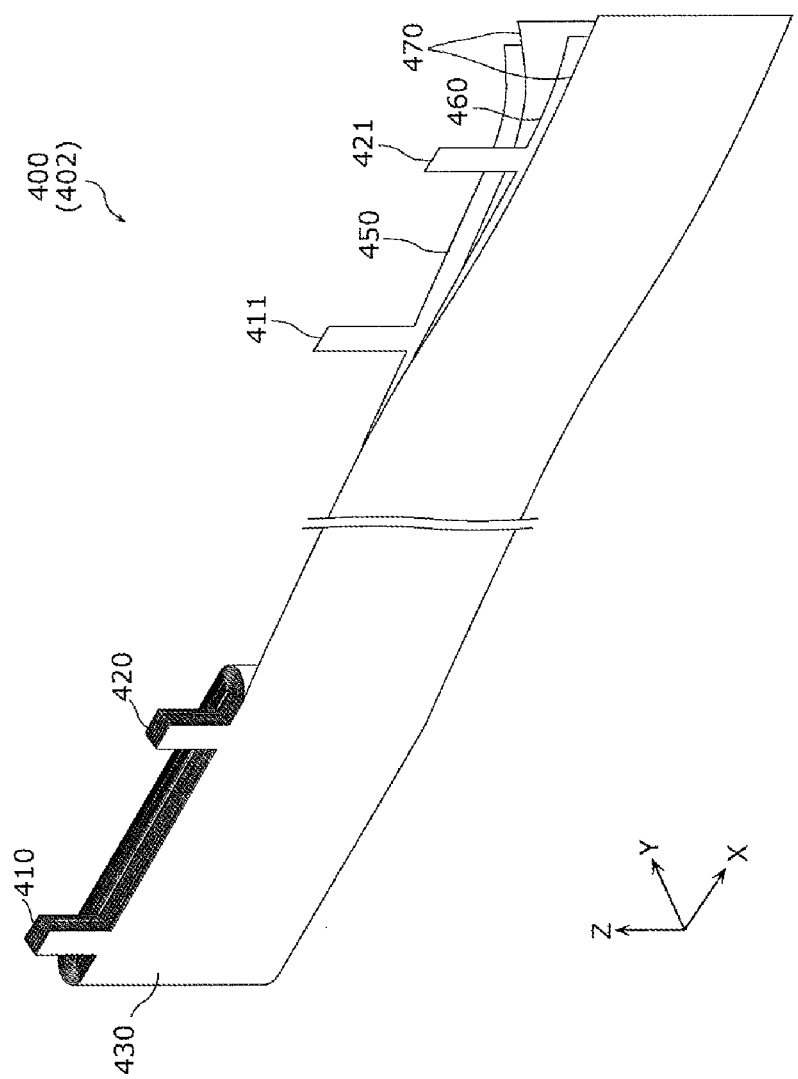
FIG. 3 is a perspective view showing a configuration of each electrode assembly according to the embodiment.
Figure 4:
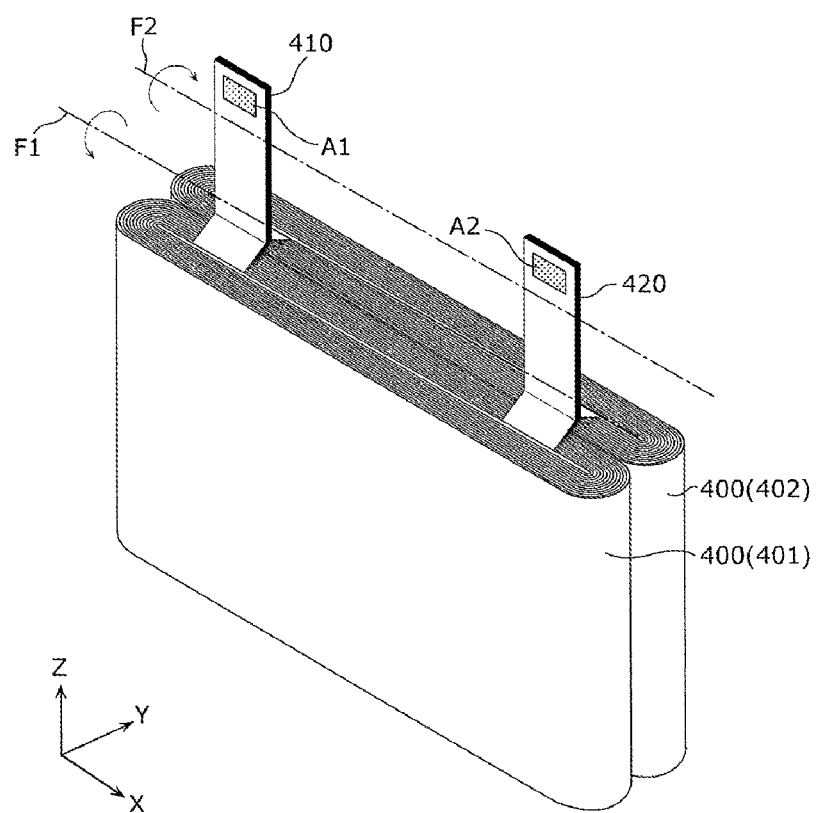
FIG. 4 is a perspective view showing a configuration of a plurality of electrode assemblies housed in a container in the embodiment.

Next, the configurations of the electrode assemblies 400 (electrode assemblies 401, 402) are described also with reference to FIG. 3 and FIG. 4. In this embodiment, the electrode assembly 401 and the electrode assembly 402 have substantially the same configuration. Accordingly, in the description made hereinafter, as the configurations of the electrode assemblies 400, the configuration of the electrode assembly 402 is mainly described, and the configuration of the electrode assembly 401 is described in a simplified manner.

FIG. 3 is a perspective view showing the configuration of each electrode assembly 400 according to the embodiment. FIG. 4 is a perspective view showing configurations of the plurality of electrode assemblies 400 (electrode assembly 401 and electrode assembly 402) housed in the container 100 in the embodiment.

FIG. 3 is a view showing a state where a winding state of the electrode assembly is partially developed, and shows a state before the tab portions 410, 420 are collected. FIG. 4 shows a state after the plurality of electrode assemblies 400 are arranged and the tab portions 410, 420 are collected respectively. These drawings show a state where the tab portions 410, 420 of the electrode assembly 400 are developed from a bending state.

The electrode assembly 400 is a power generating element which can store electricity therein. As shown in FIG. 3, the electrode assembly 400 includes a positive electrode 450, a negative electrode 460, and separators 470, and is formed such that the positive electrode 450, the negative electrode 460, and the separators 470 are stacked to each other in a Y axis direction. To be more specific, the electrode assembly 400 is a winding-type electrode assembly which is formed by winding the positive electrode 450, the negative electrode 460, and the separators 470, and is electrically connected to the positive electrode current collector 140 and the negative electrode current collector 150.

The positive electrode 450 is an electrode plate where a positive active material layer is formed on a surface of a positive electrode substrate layer which is a metal foil made of aluminum, an aluminum alloy or the like and having an elongated strip shape. As a positive active material used for forming the positive active material layer, a known material can be used as desired provided that the material is a positive active material which can occlude and discharge lithium ions. For example, as a positive active material, a polyanion compound such as $LiMPO_4$, $LiMSiO_4$, $LiMBO_3$ (M indicating one kind or two or more kinds of transition metal elements selected from Fe, Ni, Mn, Co and the like), a spinel compound such as lithium titanate, lithium manganate, lithium transition metal oxide such as $LiMO_2$ (M indicating one kind or two or more kinds of transition metal elements selected from Fe, Ni, Mn, Co and the like) or the like can be used.

The negative electrode 460 is an electrode plate where a negative active material layer is formed on a surface of a negative electrode substrate layer which is a metal foil made of copper, a copper alloy or the like and having an elongated strip shape. As a negative active material used for forming the negative active material layer, a known material can be used as desired provided that the material is a negative active material which can occlude and discharge lithium ions. For example, as a negative active material, besides lithium metal and a lithium alloy (a lithium metal containing alloy such as lithium-aluminum, lithium-lead, lithium-tin, lithium-aluminum-tin, lithium-gallium, and a wood alloy), an alloy which can occlude and discharge lithium, a carbon material (for example, graphite, hardly graphitizable carbon, easily graphitizable carbon, low temperature sintered carbon, amorphous carbon or the like), metal oxide, lithium metal oxide ($Li_4Ti_5O_{12}$ or the like), polyphosphoric acid compound or the like can be named.

The separators 470 are formed of a microporous sheet made of a resin. The separators 470 used in the energy storage device 10 are not different from the conventionally-used separator and hence, a known material can be used as desired provided that the performance of the energy storage device 10 is not impaired. As an electrolyte solution (non-aqueous electrolyte) sealed in the container 100, a kind of the electrolyte solution is not particularly limited and any kind of electrolyte solution can be selected from various kinds of electrolyte solutions provided that performance of the energy storage device 10 is not impaired.

The electrode assembly 400 is formed by winding the positive electrode 450, the negative electrode 460, and the separators 470 which are disposed in a layered manner such that the separators 470 are sandwiched between the positive electrode 450 and the negative electrode 460. The positive electrode 450 has a plurality of projecting portions 411 which project outward at one end of the positive electrode 450 in a winding axis direction, and in the same manner as the positive electrode 450, also the negative electrode 460 has a plurality of projecting portions 421 which project outward at one end of the negative electrode 460 in a winding axis direction. In this embodiment, the plurality of projecting portions 411 and the plurality of projecting portions 421 are portions (active material layer non-forming portions) where an active material is not applied by coating and the substrate layer is exposed (an active material layer is not formed).

The winding axis is an imaginary axis used as a center axis in winding the positive electrode 450, the negative electrode 460 and the like. In this embodiment, the winding axis is a straight line passing the center of the electrode assembly 400 and extending parallel to the Z axis direction.

The plurality of projecting portions 411 and the plurality of projecting portions 421 are respectively disposed on edges of the positive electrode 450 and the negative electrode 460 on the same side in the winding axis direction. In a state where the positive electrode 450 and the negative electrode 460 are stacked to each other, the plurality of projecting portions 411 and the plurality of projecting portions 421 are respectively stacked to each other at predetermined positions of the electrode assembly 400. To be more specific, the plurality of projecting portions 411 are stacked to each other at a predetermined position in a circumferential direction at one end in the winding axis direction by winding and stacking the positive electrode 450. The plurality of projecting portions 421 are stacked to each other at a predetermined position in the circumferential direction different from the position where the plurality of projecting portions 411 are stacked to each other at one end in the winding axis direction by winding and stacking the negative electrode 460.

In this embodiment, two electrode assemblies 400 (electrode assemblies 401, 402) are disposed in parallel. Accordingly, from a viewpoint of enhancing the operability in bundling the plurality of projecting portions 411, 421 of the respective electrode assemblies 400, a viewpoint of shortening lengths of the plurality of projecting portions 411, 421 and the like, the electrode assembly 401 and the electrode assembly 402 are disposed such that the projecting portions 411, 421 of the electrode assembly 401 and the projecting portions 411, 421 of the electrode assembly 402 are disposed close to each other respectively. To be more specific, in the electrode assembly 401, the projecting portions 411, 421 are formed in a plus side in the Y axis direction with respect to the winding axis, and in the electrode assembly 402, the projecting portions 411, 421 are formed on a minus side in the Y axis direction with respect to the winding axis.

With such an arrangement, the plurality of projecting portions 411 of the electrode assembly 401 and the plurality of projecting portions 411 of the electrode assembly 402 are disposed in a stacking manner. The same goes for the relationship between the plurality of projecting portions 421 of the electrode assembly 401 and the plurality of projecting portions 421 of the electrode assembly 402.

The plurality of stacked projecting portions 411 are collected toward the center in the stacking direction and are brought into close contact with each other in the stacking direction thus forming the positive-electrode-side tab portion 410. That is, the tab portion 410 is formed by bundling portions (projecting portions 411) projecting from the plurality of stacked positive electrodes 450 which form the electrode assembly 400.

In the same manner, the plurality of projecting portions 421 are collected toward the center in the stacking direction and are brought into close contact with each other in the stacking direction thus forming the negative-electrode-side tab portion 420. That is, the tab portion 420 is formed by bundling portions (projecting portions 421) projecting from the plurality of stacked negative electrodes 460 which form the electrode assembly 400.

As described above, each of the electrode assemblies 401, 402 includes the outwardly projecting tab portions 410, 420.

The tab portion 410 is connected to the positive electrode current collector 140 by welding or the like at a connecting portion A1, and the tab portion 410 is disposed such that the connecting portion A1 is housed in the recessed portion 114. The tab portion 420 is connected to the negative electrode current collector 150 by welding or the like at a connecting portion A2, and the tab portion 420 is disposed such that the connecting portion A2 is housed in the recessed portion 115. To be more specific, the tab portion 410 is disposed such that a base portion side of the tab portion 410 is bent toward a minus side in the Y axis direction about an imaginary rotation axis F1 shown in FIG. 4 and, further, a distal end side of the tab portion 410 is bent toward a plus side in the Y axis direction about an imaginary rotation axis F2 shown in FIG. 4. The same goes for the tab portion 420.

With such a configuration, the electrode assemblies 401, 402 are connected to the positive electrode current collector 140 through the tab portion 410, and are connected to the negative electrode current collector 150 through the tab portion 420.

In this embodiment, the tab portion 410 is formed by stacking the projecting portions 411 which are portions where the substrate layer is exposed and hence, the tub portion 410 is a portion which does not contribute to power generation. In the same manner, the tab portion 420 is formed by stacking the projecting portions 420 which are portions where the substrate layer is exposed and hence, the tab portion 420 is a portion which does not contribute to power generation. On the other hand, portions of the electrode assembly 400 different from the tab portions 410, 420 are formed by stacking portions where an active material is applied by coating to the substrate layer and hence, the portions contributes to power generation. Hereinafter, the portions are referred to as a power generating portion 430.

The number of electrode assemblies 400 which the energy storage device 10 includes is not particularly limited, one or three or more electrode assemblies 400 may be provided. However, when the energy storage device 10 includes the plurality of electrode assemblies 400, dead spaces at corner portions of the container 100 can be reduced compared to a case where a single electrode assembly 400 is housed in the container 100 having the same volume (capacity). Accordingly, it is possible to allow the electrode assembly to ensure a large occupying ratio in the container 100 and hence, it is possible to increase a capacity of the energy storage device 10.

Next, an arrangement at the connecting portion between the electrode assembly 400, the positive electrode current collector 140, and the negative electrode current collector 150 in the energy storage device 10 according to this embodiment is described in detail with reference to FIG. 5 to FIG. 7. In this embodiment, the positive-electrode-side connecting portion and the negative-electrode-side connecting portion are disposed in the same manner. Accordingly, the description is made hereinafter mainly with respect to the configuration relating to the negative-electrode-side connecting portion, and the configuration relating to the positive-electrode-side members is described in a simplified manner.

Figure 5:
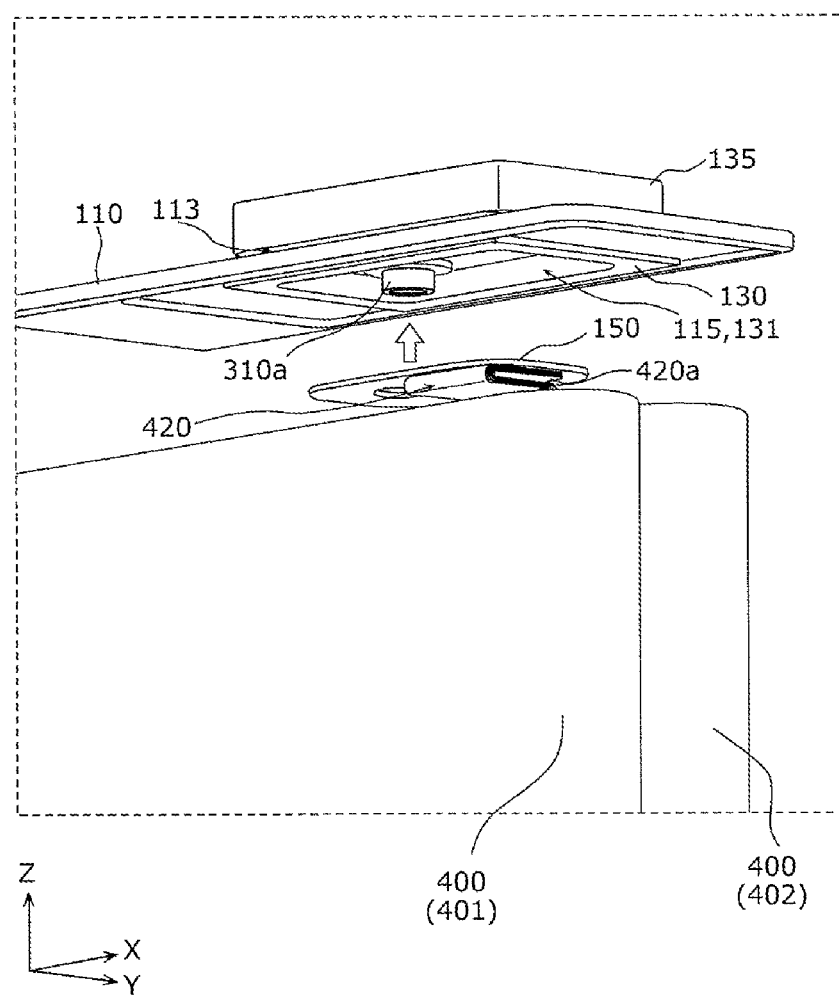
FIG. 5 is a perspective view showing the inside of a recessed portion and the structure around the recessed portion in the embodiment.

FIG. 5 is a perspective view showing the inside of the recessed portion 115 and the structure around the recessed portion 115. FIG. 6 is a first cross-sectional view of the energy storage device 10 according to this embodiment. FIG. 7 is a second cross-sectional view of the energy storage device 10 according to this embodiment. To be more specific, FIG. 5 is a perspective view showing a state where the lid body 110, the members around the lid body 110, the main body 111, and the members around the main body 111 are separated from each other by virtually releasing caulking by the fastening portion 310, FIG. 6 is a cross-sectional view of the recessed portion 115 of the energy storage device 10 and an area around the recessed portion 115 taken along a YZ plane, and FIG. 7 is a cross-sectional view of the recessed portion 115 of the energy storage device 10 and an area around the recessed portion 115 taken along an XZ plane.

Figure 6:
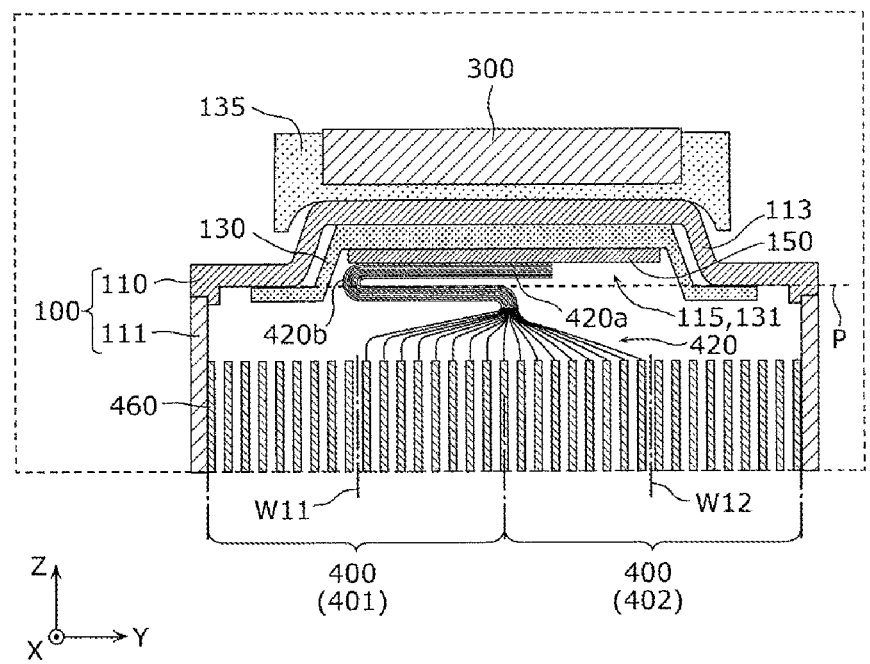
FIG. 6 is a first cross-sectional view of the energy storage device according to the embodiment.

In FIG. 5, the illustration of the main body 111 is omitted, and in FIG. 6, the illustration of the positive electrode 450 and the separators 470 which form the electrode assembly 400 is omitted. The tab portion 420 is formed of the portions of the negative electrode 460 where an active material is not applied by coating and the substrate layer is exposed and hence, the tab portion 420 is shown with a smaller film thickness than other portions of the negative electrode 460.

Further, a winding axis W11 of the electrode assembly 401 and a winding axis W12 of the electrode assembly 402 are shown by a broken line.

As shown in these drawings, the tab portion 420 is disposed at a position facing the inner surfaces of the recessed portion 115. That is, the tab portion 420 is disposed in a projecting manner at the position of the electrode assembly 400 facing the inner surfaces of the recessed portion 115. To be more specific, the tab portion 420 is disposed directly below (on a minus side in the Z axis direction of) the recessed portion 115, and the whole tab portion 420 is disposed in the recessed portion 115 as viewed in the Z axis direction.

In this embodiment, the inner surfaces of the recessed portion 115 are covered by the lower insulating member 130 and hence, the tab portion 420 faces also inner surfaces of the recessed portion 131 formed on the lower insulating member 130.

As shown in these drawings, the lower insulating member 130 is disposed so as to cover the inner surfaces of the recessed portion 115 and, further, to cover the inner surface of the lid body 110 positioned around the recessed portion 115. To be more specific, the lower insulating member 130 is formed so as to project outward from the recessed portion 115 as viewed in a depth direction of the recessed portion 115 (as viewed from a plus side in the Z axis direction). That is, the lower insulating member 130 has a flat plate portion which covers the inner surface of the lid body 110 disposed around the recessed portion 115.

As shown in FIG. 5, the negative-electrode-side connecting portion is housed in the recessed portion 115 in such a manner that the negative electrode current collector 150 is caulked by the fastening portion 310. In this embodiment, the whole negative electrode current collector 150 is housed in the recessed portion 115 and hence, the negative-electrode-side connecting portion is also housed in the recessed portion 115. It is sufficient that at least a connecting portion of the negative electrode current collector 150 with the tab portion 420 be housed in the recessed portion 115, or the negative electrode current collector 150 may include a portion which is disposed outside the recessed portion 115 without being housed in the recessed portion 115.

As described above, the negative-electrode-side connecting portion is housed in the recessed portion 115 and hence, the connecting portion A2 (see FIG. 4) of the tab portion 420 with the negative electrode current collector 150 is housed in the recessed portion 115. In this embodiment, the connecting portion A2 is positioned at a distal end portion 420a of the tab portion 420. Accordingly, the distal end portion 420a of the tab portion 420 is housed in the recessed portion 115.

With respect to a length of the tab portion 420, it is preferable to ensure a proper length from a viewpoint of enhancing operability in connecting the tab portion 420 and the negative electrode current collector 150 to each other. On the other hand, an excessive increase in the length of the tab portion 420 brings about an increase in a width (a size in the winding axis direction) of the electrode plate of the negative electrode 460 and hence, the excessive increase in the length of the tab portion 420 may be a factor which causes the lowering of mass production efficiency. Accordingly, since the tab portion 420 is connected to the negative electrode current collector 150 at the distal end portion 420a, the operability in connecting the tab portion 420 and the negative electrode current collector 150 to each other can be enhanced while suppressing the lowering of mass production efficiency.

In a state where the tab portion 420 is bent, the connecting portion between the tab portion 420 and the negative electrode current collector 150 is housed in the recessed portion 115. As described above, with respect to the length of the tab portion 420, it is preferable to ensure a proper length from a viewpoint of ensuring operability in connecting the tab portion 420 to the negative electrode current collector 150. Accordingly, when the tab portion 420 having such a length is housed in the recessed portion 115 without being bent, a portion of the tab portion 420 which is not housed in the recessed portion 115 is increased. The increase of such a portion brings about the increase in the dead spaces in the container 100 around the tab portion 420. Accordingly, the tab portion 420 is connected to the negative electrode current collector 150 in a bending posture and hence, the dead spaces in the container 100 can be reduced while enhancing the operability in connecting the tab portion 420 and the negative electrode current collector 150 to each other.

As shown in FIG. 6, the tab portion 420 is bent in the recessed portion 115. That is, the tab portion 420 has a bent portion 420b which is housed in the recessed portion 115. To be more specific, the bent portion 420b has at least a portion thereof disposed at a position of the recessed portion 115 (a plus side in the Z axis direction) deeper than an opening surface P of the recessed portion 115. The opening surface P is a plane parallel to the XY plane including an edge of the recessed portion 115.

The bent portion 420b is a portion which is formed by bending the tab portion 420 about the imaginary rotation axis F2 (see FIG. 4). Accordingly, at the bent portion 420b, the tab portion 420 is bent at an approximately 180°. In other words, the tab portion 420 is folded back at the bent portion 420b.

That is, the tab portion 420 has the connecting portion A2 (see FIG. 4) of the electrode assembly 400 extending parallel to the negative electrode current collector 150 (parallel to the XY plane in this embodiment), and the bent portion 420b which is bent from the connecting portion A2. To be more specific, the bent portion 420b is bent in a direction different from a direction toward the bent portion 420b from the connecting portion A2. In this embodiment, the bent portion 420b is bent in a direction parallel to the connecting portion A2, and to be more specific, the bent portion 420b is bent in a direction toward a plus side in the Y axis direction from a direction toward a minus side in the Y axis direction.

A bending angle of the tab portion 420 at the bent portion 420b is not limited to 180°, and may be set to an arbitrary angle corresponding to a length of the tab portion 420, a positional relationship between the electrode assembly 400 and the negative electrode current collector 150 or the like.

"The connecting portion 2A is disposed parallel to the negative electrode current collector 150" includes not only a case where the connecting portion A2 is disposed parallel to the whole negative electrode current collector 150 but also a case where the connecting portion A2 is disposed parallel only with respect to the connecting portion of the negative electrode current collector 150 with the tab portion 420. For example, when the negative electrode current collector 150 is not formed into a flat planar shape but a stepped shape or a twisted shape, it is sufficient that the connecting portion A2 be disposed parallel to the above-mentioned connecting portion of the negative electrode current collector 150. That is, the connecting portion A2 may not be disposed parallel to other portions of the negative electrode current collector 150.

Figure 7:
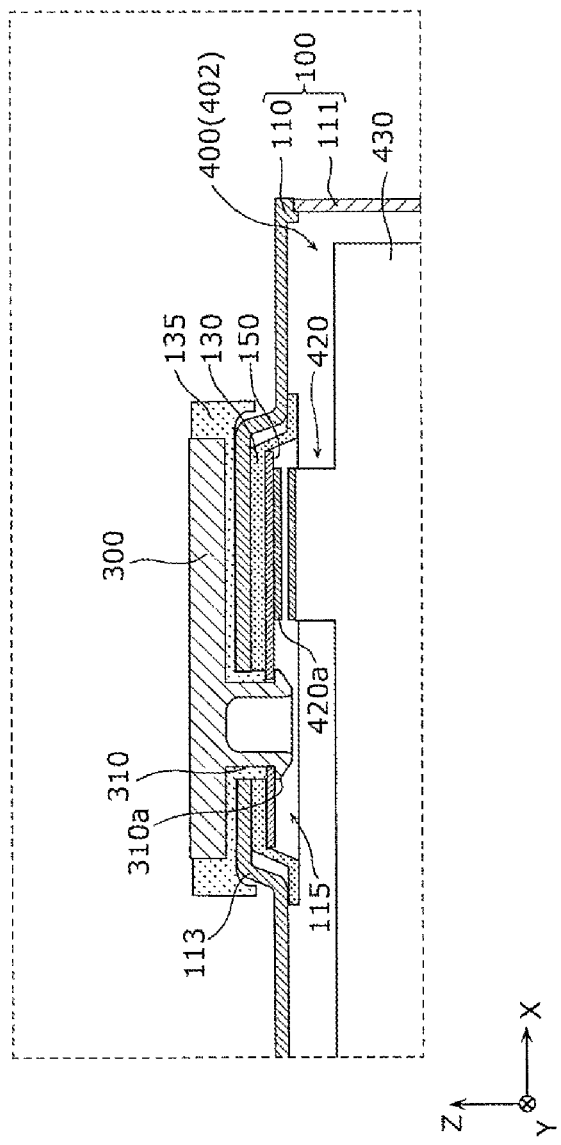
FIG. 7 is a second cross-sectional view of the energy storage device according to the embodiment.

As shown in FIG. 7, the distal end portion 310a of the fastening portion 310 is disposed in the recessed portion 115. In this embodiment, the fastening portion 310 is caulked in a state where the fastening portion 310 is inserted into the through hole 130a which opens in a bottom surface of the recessed portion 131 formed on the lower insulating member 130 (see FIG. 2). Accordingly, the distal end portion 310a is positioned inside the recessed portion 115 formed on the lid body 110.

The energy storage device 10 according to this embodiment has been described heretofore. Hereinafter, the description is made with respect to advantageous effects acquired by the above-mentioned energy storage device 10 including the history leading to the present invention. Hereinafter, advantageous effects acquired by the configuration on the negative electrode side (the recessed portion 115, the negative electrode current collector 150, the tab portion 420 and the like) are described. However, the same goes for advantageous effects acquired by the configuration on the positive electrode side (the recessed portion 114, the positive electrode current collector 140, the tab portion 410 and the like).

Generally, at a connecting portion between an electrode assembly and a current collector, the electrode assembly and the current collector are connected to each other in a state where a plurality of stacked plates which form the electrode assembly are collected. Accordingly, the electrode assembly is not disposed on the periphery of the connecting portion of a container of an energy storage device so that a dead space is formed. Such a dead space does not contribute to power generation of the energy storage device and hence, the increase in the capacity of the energy storage device is obstructed. Further, at the connecting portion between the electrode assembly and the current collector, to ensure the electrical and structural connection between the electrode assembly and the current collector, an active material is not applied by coating to the plates which form the electrode assembly so that a substrate layer is exposed. Accordingly, the connecting portion between the electrode assembly and the current collector does not contribute to the power generation of the energy storage device.

In view of the above, according to this embodiment, the connecting portion (in this embodiment, the negative-electrode-side connecting portion) between the electrode assembly 400 and the negative electrode current collector 150 is housed in the recessed portion 115 of the container 100. Accordingly, the dead space around the connecting portion is reduced and hence, it is possible to allow the electrode assembly 400 to ensure a large occupying ratio in the container 100. Further, the connecting portion between the electrode assembly 400 and the negative electrode current collector 150 is housed in the recessed portion 115 of the container 100 and hence, an occupying ratio of the portion which does not contribute to the power generation of the energy storage device 10 in the container 100 can be decreased. In other words, it is possible to allow a portion which contributes to the power generation (in this embodiment, the power generating portion 430) to ensure a large occupying ratio in the container 100. Therefore, according to this embodiment, it is possible to increase a capacity of the energy storage device 10.

"Housed in the recessed portion 115" means that "disposed in a space surrounded by the recessed portion 115". For example, "Housed in the recessed portion 115" means that "disposed at a position deeper than the opening surface P".

According to this embodiment, the electrode assembly 400 has the tab portion 420 projecting outward and including the connecting portion between the electrode assembly 400 and the negative electrode current collector 150. With such a configuration, the connecting portion between the electrode assembly 400 and the negative electrode current collector 150 can be easily housed in the recessed portion 115 of the container 100.

The electrode assembly 400 is connected to the negative electrode current collector 150 using the tab portion 420 and hence, compared to an electrode assembly including no tab portion 420, a portion of the electrode assembly 400 which does not contribute to the power generation can be reduced. In other words, it is possible to allow a portion which contributes to the power generation to ensure a large occupying ratio in the container 100. Accordingly, it is possible to further increase a capacity of the energy storage device 10.

According to this embodiment, the tab portion 420 has the bent portion 420b housed in the recessed portion 115 and hence, a dead space in the container 100 can be further reduced. Accordingly, it is possible to allow the electrode assembly 400 to ensure a larger occupying ratio in the container 100.

According to this embodiment, the tab portion 420 is disposed at the position facing the inner surfaces of the recessed portion 115 and hence, a length of the tab portion 420 can be shortened whereby a dead space in the container 100 can be further reduced. To be more specific, the connecting portion between the tab portion 420 and the negative electrode current collector 150 is housed in the recessed portion 115 and hence, when the tab portion 420 projects at a position different from the position facing the inner surfaces of the recessed portion 115 (for example, a position excluding a position direct below the recessed portion 115), a length of the tab portion 420 is increased. Accordingly, a dead space in the container 100 is increased. In view of the above, by arranging the tab portion 420 at the position facing the inner surfaces of the recessed portion 115, the tab portion 420 projects at the position facing the inner surfaces of the recessed portion 115 and hence, a dead space in the container 100 can be further decreased. Accordingly, it is possible to allow the electrode assembly 400 to ensure a larger occupying ratio in the container 100.

According to this embodiment, the inner surfaces of the recessed portion 115 are covered by the insulating member (in this embodiment, the lower insulating member 130) and hence, it is possible to ensure insulation between the electrode assembly 400 and the negative electrode current collector 150 positioned in the recessed portion 115 and the container 100.

According to this embodiment, the insulating member further covers the inner surface of the container 100 (in this embodiment, the lid body 110) positioned around the recessed portion 115 and hence, it is possible to ensure insulation between the electrode assembly 400 and the container 100 with more certainty. To be more specific, since the electrode assembly 400 has a large thickness, the plurality of stacked plates which form the electrode assembly 400 are gathered toward the connecting portion between the electrode assembly 400 and the negative electrode current collector 150 thus being connected to the negative electrode current collector 150. Accordingly, the electrode assembly 400 has a shape gradually expanding in the stacking direction as the electrode assembly 400 is separated from the connecting portion with the negative electrode current collector 150. With such a configuration, around the recessed portion 115, there may be a case where the electrode assembly 400 is disposed in a largely expanded manner beyond the opening of the recessed portion 115. In view of the above, by arranging the insulating member so as to cover the inner surface of the container 100 positioned around the recessed portion 115, it is possible to ensure insulation between the electrode assembly 400 and the container 100 with more certainty.

According to this embodiment, the distal end portion 310a of the fastening portion 310 on an inner side of the container 100 is disposed inside the recessed portion 115 and hence, a ratio of a space which can be utilized as a space for disposing the electrode assembly 400 in the container 100 can be further increased. For example, when the whole distal end portion 310a is disposed inside the recessed portion 115, the whole space in the container 100 excluding the recessed portion 115 can be utilized as a space for disposing the electrode assembly 400. Accordingly, it is possible to allow the electrode assembly 400 to ensure a larger occupying ratio in the container 100.

The energy storage device 10 according to this embodiment is manufactured by a manufacturing method exemplified hereinafter, for example.

That is, the tab portion 410 and the positive electrode current collector 140 are connected to each other at the connecting portion A1 of the tab portion 410 shown in FIG. 4, and the tab portion 420 and the negative electrode current collector 150 are connected to each other at the connecting portion A2 of the tab portion 420. In this embodiment, a method of connecting the tab portion 410 and the positive electrode current collector 140 to each other is not particularly limited, and as a method of connecting the tab portion 410 and the positive electrode current collector 140 to each other, welding such as ultrasonic welding or resistance welding, or mechanical joining such as mechanical caulking can be adopted. The same goes for the method of connecting the tab portion 420 and the negative electrode current collector 150 to each other.

Next, by inserting the fastening portion 210 into the through hole 140a of the positive electrode current collector 140 and by caulking the fastening portion 210, the positive electrode current collector 140 and the lid body 110 are fastened to each other. In the same manner, the fastening portion 310 is inserted into the through hole 150a of the negative electrode current collector 150 and by caulking the fastening portion 310, the negative electrode current collector 150 and the lid body 110 are fastened to each other.

Thereafter, by bending the tab portions 410, 420 two times about the rotation axes F1, F2 shown in FIG. 4 respectively, the energy storage device 10 according to this embodiment is manufactured.

The number of electrode assemblies housed in the container 100, configurations of the electrode assemblies and like may differ from those of the above-mentioned embodiment. Hereinafter, various modifications of the electrode assembly according to the embodiment are described with reference to FIG. 8 and FIG. 9.

(Modification 1)

In the above-mentioned embodiment, the energy storage device 10 includes two electrode assemblies 400 (electrode assemblies 401, 402). However, in this modification, an energy storage device includes one electrode assembly.

Figure 8:
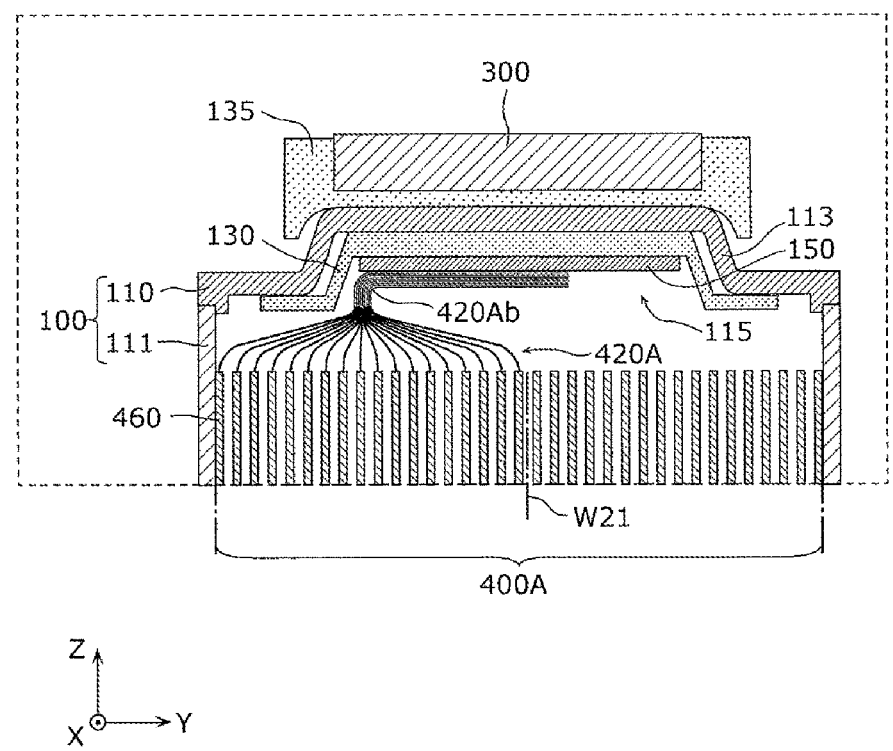
FIG. 8 is a cross-sectional view of an energy storage device according to a modification 1 of the embodiment.

FIG. 8 is a cross-sectional view of an energy storage device according to the modification 1 of the embodiment. To be more specific, FIG. 8 is a cross-sectional view of a recessed portion 115 of the energy storage device and an area around the recessed portion 115 taken along a YZ plane in the same manner as FIG. 6. In FIG. 8, the illustration of a positive electrode and separators which form an electrode assembly 400A is omitted. A tab portion 420A is a portion of a negative electrode 460 where an active material is not applied by coating and a substrate layer is exposed and hence, the tab portion 420A is shown with the smaller film thickness than other portion of the negative electrode 460. In FIG. 8, a winding axis W21 of the electrode assembly 400A is shown by a broken line.

The electrode assembly 400A shown in FIG. 8 is formed by winding and stacking the positive electrode, the negative electrode 460 and the like about the winding axis W21. The tab portion 420A is formed by stacking projecting portions 421 of respective layers of the stacked negative electrodes 460 and hence, the projecting portions 421 are gathered from one side of the electrode assembly 400A with respect to the winding axis W21.

The tab portion 420 in the above-mentioned embodiment is connected to the negative electrode current collector 150 in a state where the tab portion 420 is bent two times. However, the tab portion 420A of this modification is connected to a negative electrode current collector 150 in a state where the tab portion 420A is bent one time.

In this modification, at a bent portion 420Ab, the tab portion 420A is bent by an approximately 90°.

That is, the tab portion 420A has a connecting portion of the electrode assembly 400 extending parallel to the negative electrode current collector 150 (in this modification, parallel to the XY plane), and the bent portion 420Ab which is bent from the connecting portion. To be more specific, the bent portion 420Ab is bent in a direction different from a direction toward the bent portion 420Ab from the connecting portion, and in more detail, the bent portion 420Ab is bent in a direction toward a minus side in the Z axis direction from a direction toward a minus side in the Y axis direction.

As described above, the tab portion 420A is connected to the negative electrode current collector 150 in a state where the tab portion 420A is bent one time and hence, a length of the tab portion 420A can be shortened. Accordingly, a width of the electrode plate (a size in the winding axis direction) of the negative electrode 460 can be decreased and hence, mass production efficiency can be enhanced.

The connecting portion between the tab portion 420A and the negative electrode current collector 150 is, in the same manner as the embodiment, housed in the recessed portion 115 formed on the container 100 (in this modification, a lid body 110). Accordingly, even when one electrode assembly 400A is housed in the container 100 as in the case of this modification, in the same manner as the above-mentioned embodiment, a dead space around the connecting portion between the tab portion 420A and the negative electrode current collector 150 can be reduced and hence, it is possible to allow the electrode assembly 400A to ensure a large occupying ratio in the container 100.

(Modification 2)

In the above-mentioned embodiment and the modification 1, the energy storage device 10 includes the winding-type electrode assembly. However, in this modification, an energy storage device includes an electrode assembly which is formed by stacking flat-plate-like plates on each other.

Figure 9:
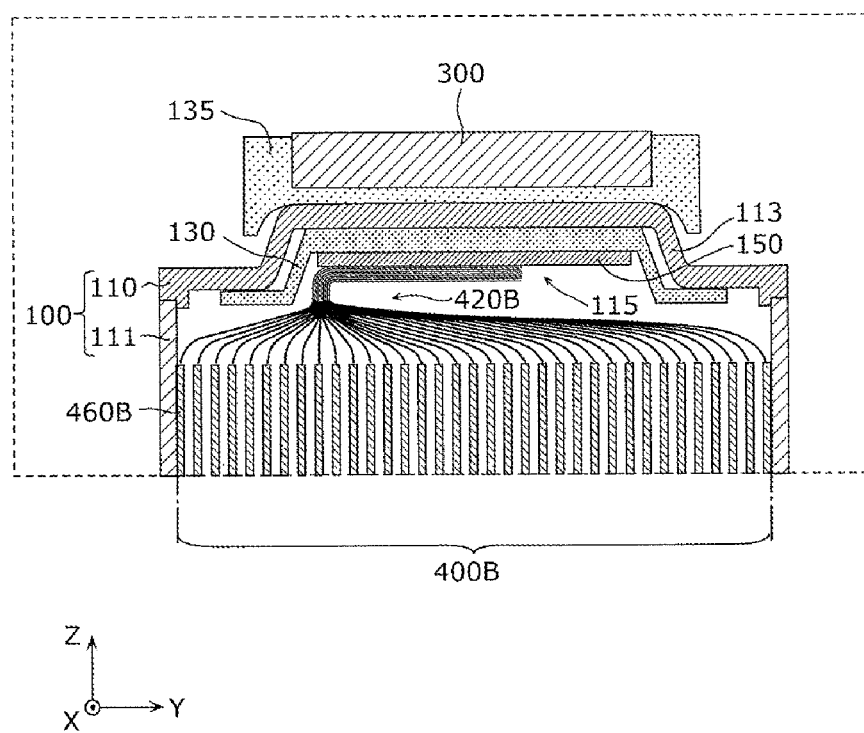
FIG. 9 is a cross-sectional view of an energy storage device according to a modification 2 of the embodiment.

FIG. 9 is a cross-sectional view of an energy storage device according to the modification 2 of the embodiment. To be more specific, FIG. 9 is a cross-sectional view of a recessed portion 115 of the energy storage device and an area around the recessed portion 115 taken along a plane YZ in the same manner as FIG. 6. In FIG. 9, the illustration of a positive electrode and separators which form an electrode assembly 400B is omitted. A tab portion 420B is a portion of a negative electrode 460B where an active material is not applied by coating and a substrate layer is exposed and hence, the tab portion 420B is shown with the smaller film thickness than other portion of the negative electrode 460.

The electrode assembly 400B shown in FIG. 9 is, different from the electrode assembly 400 according to the above-mentioned embodiment and the modification 1, formed by stacking a plurality of positive electrodes, negative electrodes 460B and the like each having a flat plate shape on each other. The tab portion 420B is formed by stacking projecting portions 421 of respective layers of the stacked negative electrodes 460 and hence, in this modification, the projecting portions 421 are gathered from respective layers of the electrode assembly 400B.

The connecting portion between the tab portion 420B and the negative electrode current collector 150 is, in the same manner as the embodiment, housed in the recessed portion 115 formed on the container 100 (in this modification, a lid body 110). Accordingly, even when the stacking-type electrode assembly 400B is housed in the container 100 as in the case of this modification, in the same manner as the above-mentioned embodiment, a dead space around the connecting portion between the tab portion 420B and the negative electrode current collector 150 can be reduced and hence, it is possible to allow the electrode assembly 400B to ensure a large occupying ratio in the container 100.

However, in the stacking-type electrode assembly 400B, a volume which the tab portion occupies is increased compared to the winding-type electrode assembly. Accordingly, from a viewpoint of space saving of a tab portion, it is preferable to adopt the configuration which adopts the winding-type electrode assembly.

(Another Modification)

Although the energy storage devices according to the embodiment of the present invention and the modifications of the embodiment have been described heretofore, the present invention is not limited to the embodiment and the modifications of the embodiment.

That is, it should be construed that the embodiment and the modifications of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, the electrode assembly is not limited to an electrode assembly of a winding type or a stacking type, and may be of a type where a plate having an elongated strip shape is stacked in a bellows shape by folding the plate such that mount folding and valley folding are repeated.

The positional relationship between the positive-electrode-side tab portion and the negative-electrode-side tab portion is not particularly limited. For example, the positive-electrode-side tab portion and the negative-electrode-side tab portion may be disposed opposite to each other with respect to a winding axis direction in the winding-type electrode assembly, or may be disposed in different directions as viewed in a stacking direction in the stacking-type electrode assembly.

The electrode assembly is not limited to a configuration including the tab portion, for example, the winding-type electrode assembly may be configured such that a positive electrode current collector is connected to a positive-electrode active material layer non-forming portion disposed on one end in a winding axis direction, and a negative current collector is connected to a negative-electrode active material layer non-forming portion disposed on the other end in the winding axis direction. Even with such a configuration, a positive-electrode-side connecting portion and a negative-electrode-side connecting portion are housed in recessed portions 114, 115 formed on a container 100, respectively and hence, dead spaces around the positive-electrode-side connecting portion and the negative-electrode-side connecting portion can be reduced whereby it is possible to allow the electrode assembly to ensure a large occupying ratio in the container 100.

Further, it is sufficient that at least one of the positive-electrode-side connecting portion and the negative-electrode-side connecting portion be housed in the recessed portion of the container 100. For example, either one of the positive-electrode-side connecting portion and the negative-electrode-side connecting portion may be housed in the recessed portion.

The respective constitutional elements which form the energy storage device 10 may be configured as follows. In the description made hereinafter, although the negative-electrode-side configuration is described, the same goes for the positive-electrode-side configuration.

That is, the tab portion may not include a bent portion housed in the recessed portion 115. For example, by connecting the negative electrode current collector 150 which is formed in a twisted manner by 90° in the recessed portion 115 and the tab portion to each other, the tab portion may not be bent in the recessed portion 115. With such a configuration, the tab portion can be connected to the negative electrode current collector 150 without being bent and hence, a length of the tab portion can be shortened.

The tab portion may be disposed at a position different from the position facing the inner surfaces of the recessed portion 115 formed on the container 100. For example, the tab portion may be configured such that the tab portion is bundled at a position different from the position facing the inner surfaces of the recessed portion 115, and is connected to the negative electrode current collector 150 in the recessed portion 115 by being extended to the inside of the recessed portion 115 from such a position.

The tab portion may be configured to include: portions projecting from a plurality of plates which form the electrode assembly; and a lead plate connected to the projecting portions by welding or the like, and the lead plate may be bent. For example, the lead plate and the negative electrode current collector 150 may be formed integrally with each other.

The lower insulating member 130 may be configured to cover only the inner surfaces of the recessed portion 115 without covering the inner surface of the container 100 positioned around the recessed portion 115 formed on the container 100. The lower insulating member 130 may be configured to cover not the whole inner surfaces of the recessed portion 115 but only a portion of the inner surfaces of the recessed portion 115. For example, the lower insulating member 130 may be disposed only between the negative electrode current collector 150 and the inner surfaces of the recessed portion 115.

The fastening portion 310 may be configured such that the distal end portion 310a on an inner side of the container 100 is not disposed in the recessed portion 115.

The number of members which form the negative electrode current collector 150 is not particularly limited. For example, the negative electrode current collector 150 may be formed of one metal member, or the negative electrode current collector 150 may be formed of a plurality of metal members. For example, the negative electrode current collector 150 may be formed of two members, that is, a member which forms a portion to be fastened by the fastening portion 310 and a lead plate which forms a connecting portion connected to the electrode assembly.

Figure 10:
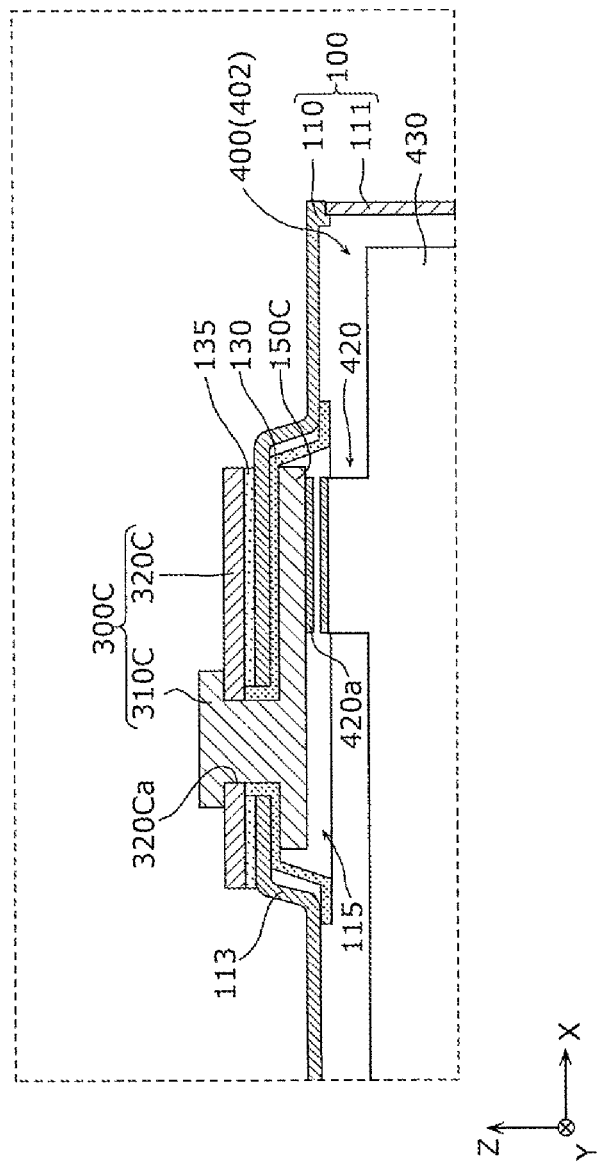
FIG. 10 is a cross-sectional view of an energy storage device according to another modification of the embodiment.

The negative electrode current collector and the negative electrode terminal are not always provided as separate bodies. As shown in FIG. 10, the negative electrode current collector and the negative electrode terminal may be partially integrally formed with each other. FIG. 10 is a cross-sectional view of an energy storage device according to another modification.

A negative electrode terminal 300C shown in FIG. 10 includes a fastening portion 310C which is integrally formed with a negative electrode current collector 150C and a flat-plate-like flat plate portion 320C compared to the negative electrode terminal 300 shown in FIG. 7.

The fastening portion 310C is a member (rivet) extending upward from the negative electrode current collector 150C, and is caulked in a state where the fastening portion 310C is inserted into a through hole 320Ca of the flat plate portion 320C. With such a configuration, the flat plate portion 320C and the negative electrode current collector 150C are electrically connected to each other, and the flat plate portion 320C is fixed to the lid body 110 together with the negative electrode current collector 150C, the lower insulating member 130, and the upper insulating member 135.

Even when the energy storage device configured as described above, in the same manner as the above-mentioned embodiment and the modifications of the embodiment, dead spaces around a connecting portion between the tab portion 420 and the negative electrode current collector 150C can be reduced and hence, it is possible to allow the electrode assembly 400 to ensure a large occupying ratio in the container 100.

The recessed portion 115 may not be formed inside a portion of the lid body 110 projecting outward. That is, the lid body 110 may have a recessed portion which is formed on an inner side of the lid body 110 by applying press working or the like to the lid body 110 such that an outer side (outer surface) of the lid body 110 is made flat and an inner side (inner surface) of the lid body 110 is recessed.

In the above-mentioned embodiment and the modifications of the embodiment, both the connecting portion of the negative electrode current collector 150 connected to the electrode assembly (hereinafter referred to as "the connecting portion of the negative electrode current collector") and the connecting portion of the electrode assembly connected to the negative electrode current collector 150 (hereinafter also referred to as "the connecting portion of the electrode assembly") are housed in the recessed portion 115. However, it is sufficient that the connecting portion of the negative electrode current collector is housed in the recessed portion 115, and the connecting portion of the electrode assembly may not be housed in the recessed portion 115. Even with such a configuration, in the same manner as the above-mentioned embodiment and the modifications of the embodiment, dead spaces around the connecting portion of the negative electrode current collector can be reduced and hence, it is possible to allow the electrode assembly to ensure a large occupying ratio in the container 100.

For example, in the above-mentioned embodiment, the tab portion 420 is connected to the negative electrode current collector 150 at the connecting portion A2, and the distal end portion 420a of the tab portion 420 at which the connecting portion A2 is positioned is housed in the recessed portion 115. That is, the distal end portion 420a which is the connecting portion of the tab portion 420 with the negative electrode current collector 150 is housed in the recessed portion 115. However, it is sufficient that the connecting portion of the negative electrode current collector (a portion of the negative electrode current collector 150 connected to the connecting portion A2) is housed in the recessed portion 115, and the distal end portion 420a may not be housed in the recessed portion 115. That is, the tab portion 420 may not be housed in the recessed portion 115.

It is sufficient for the negative electrode current collector 150 that the connecting portion of the negative electrode current collector be housed in the recessed portion 115, and a portion different from the connecting portion may not be housed in the recessed portion 115. It is sufficient for the negative electrode current collector 150 that at least a portion of the connecting portion of the negative electrode current collector be housed in the recessed portion 115, and other portion of the connecting portion may not be housed in the recessed portion 115.

The connecting portion of the negative electrode current collector forms a portion of the negative electrode current collector 150 and is defined as a portion connected to the electrode assembly by joining or the like. The connecting portion of the electrode assembly forms a portion of the electrode assembly and is defined as a portion connected to the negative electrode current collector 150 by joining or the like.

The configurations which are made by arbitrarily combining the configuration of the above-mentioned embodiment and the configurations of the modifications of the embodiment are also included in the scope of the present invention. The configuration of the above-mentioned embodiment and the configurations of the modifications of the embodiment may be partially combined with each other as desired.

INDUSTRIAL APPLICABILITYS

According to the present invention, it is possible to provide an energy storage device which allows an electrode assembly to ensure a large occupying ratio in a container by reducing dead spaces in the container and hence, the present invention is applicable to an energy storage device or the like mounted on an automobile or the like which is required to possess a high capacity.

DESCRIPTION OF REFERENCE SIGNS

10: energy storage device
100: container
110: lid body
111: main body
112, 113: projecting portion
112a, 113a, 120a, 125a, 130a, 135a, 140a, 150a, 320Ca: through hole
114, 115, 121, 131: recessed portion
120, 130: lower insulating member
125, 135: upper insulating member
140: positive electrode current collector
150, 150C: negative electrode current collector
200: positive electrode terminal
210, 310: fastening portion
300, 300C: negative electrode terminal
310a, 420a: distal end portion
310C: fastening portion
320C: flat plate portion
400, 400A, 400B, 401, 402: electrode assembly
410, 420, 420A, 420B: tab portion
411, 421: projecting portion
420b, 420Ab: bent portion
430: power generating portion
450: positive electrode
460, 460B: negative electrode
470: separator

The invention claimed is:

1. An energy storage device, comprising:
an electrode assembly that includes a tab portion, the tab portionincluding a first connecting portion and a bent portion;
a current collector that includes a second connecting portion directly connected to the first connecting portion; and
a container configured to house the electrode assembly and the current collector,
wherein the container includes a recessed portion,
wherein, in a cross-sectional view, the second connecting portion is housed in the recessed portion,
wherein the container includes a container body and a lid body,
wherein the container body is configured to house the electrode assembly, and
wherein the recessed portion is formed inside a portion of the lid body which projects outward.

2. The energy storage device according to claim 1, wherein the tab portion includes the first connecting portion of the electrode assembly extending parallel to the current collector, and the bent portion bent from the connecting portion.

3. The energy storage device according to claim 1, wherein the first connecting portion of the electrode assembly is housed in the recessed portion.

4. The energy storage device according to claim 3, wherein the bent portion is housed in the recessed portion.

5. The energy storage device according to claim 1, wherein the tab portion is formed by bundling portions projecting from stacked plates which form the electrode assembly, and the tab portion is disposed at a position which faces an inner surface of the recessed portion.

6. The energy storage device according to claim 1, further comprising an insulating member which covers an inner surface of the recessed portion.

7. The energy storage device according to claim 6, wherein the insulating member further covers an inner surface of the lid body positioned around the recessed portion.

8. The energy storage device according to claim 1, further comprising a fastening portion which fastens the lid body and the current collector to each other,
wherein a distal end portion of the fastening portion on an inner side of the lid body is disposed in the recessed portion.

9. The energy storage device according to claim 1, wherein the electrode assembly is formed by winding an electrode,
wherein the electrode includes a plurality of projecting portions which project outward at one end of the electrode in a winding axis direction, and
wherein the plurality of projecting portions are collected toward a center of the electrode in a stacking direction and are brought into a contact with each other in the stacking direction to form the tab portion.

10. The energy storage device according to claim 1, wherein an entirety of the current collector is located in the recessed portion.

11. The energy storage device according to claim 1, wherein the tab portion further includes a third connecting portion extending from the bent portion parallel to the first connecting portion.

12. The energy storage device according to claim 11, wherein an entirety of the first connecting portion is located in the recessed portion.

13. The energy storage device according to claim 12, wherein the bent portion is located in the recessed portion to connect the first connecting portion to the second connecting portion.

14. The energy storage device according to claim 1, wherein an entirety of the second connecting portion is located in the recessed portion.

15. The energy storage device according to claim 1, wherein an entirety of portions of the first connecting portion, which are in a direct contact with the second connecting portion, is located in the recessed portion.

16. An energy storage device, comprising:
an electrode assembly that includes a tab portion, the tab portion including a first connecting portion;
a current collector that includes a second connecting portion directly connected to the first connecting portion; and
a container configured to house the electrode assembly and the current collector,
wherein the container includes a recessed portion,
wherein, in a cross-sectional view, the second connecting portion is housed in the recessed portion,
wherein the container includes a container body and a lid body,
wherein the container body is configured to house the electrode assembly, and
wherein the recessed portion is formed inside a portion of the lid body which projects outward.

17. The energy storage device according to claim 16, wherein the electrode assembly includes a winding electrode,
wherein the electrode includes a plurality of projecting portions which project outward at one end of the electrode in a winding axis direction, and
wherein the plurality of projecting portions are collected toward a center of the electrode in a stacking direction to form the tab portion.

18. The energy storage device according to claim 16, wherein an entirety of the current collector is located in the recessed portion.

19. The energy storage device according to claim 16, wherein an entirety of portions of the first connecting portion, which are in a direct contact with the second connecting portion, is located in the recessed portion.

* * * * *